Feb. 24, 1970  W. E. LLOYD  3,496,933
ORAL CLEANING DEVICE
Filed Aug. 7, 1967  5 Sheets-Sheet 1
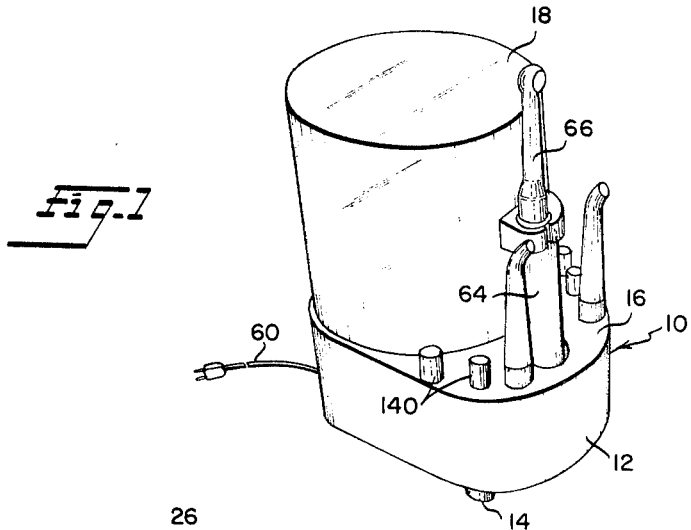
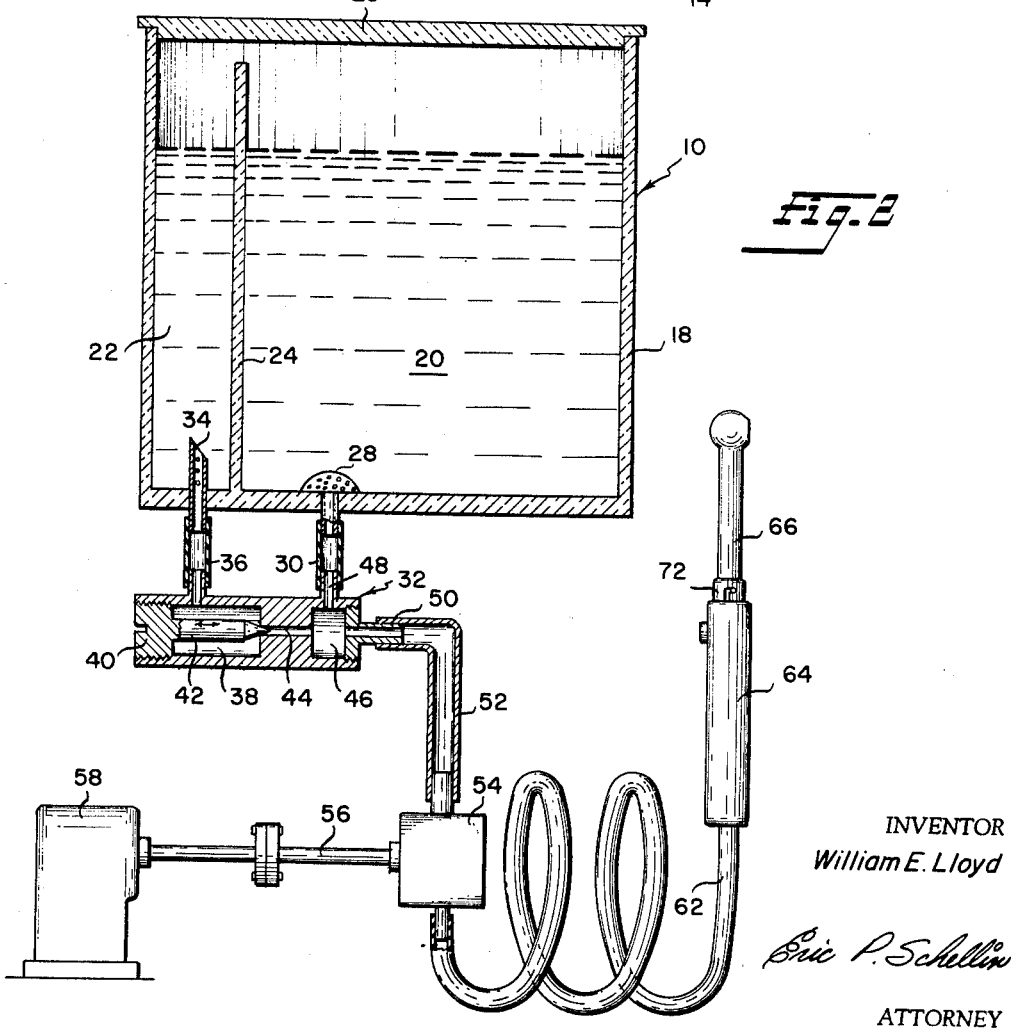
INVENTOR
William E. Lloyd
Eric P. Schellin
ATTORNEY

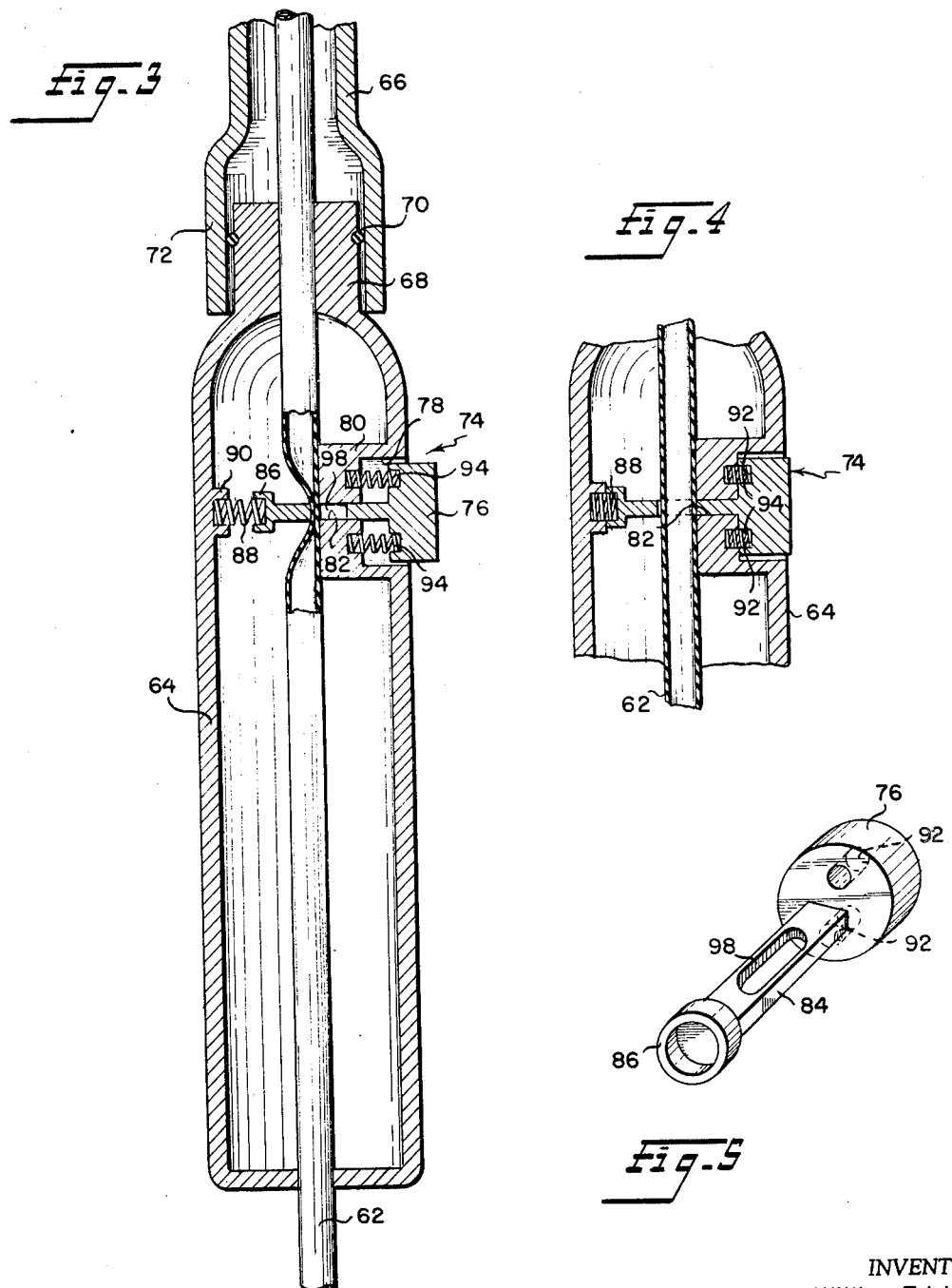

Feb. 24, 1970     W. E. LLOYD     3,496,933
ORAL CLEANING DEVICE
Filed Aug. 7, 1967     5 Sheets-Sheet 3
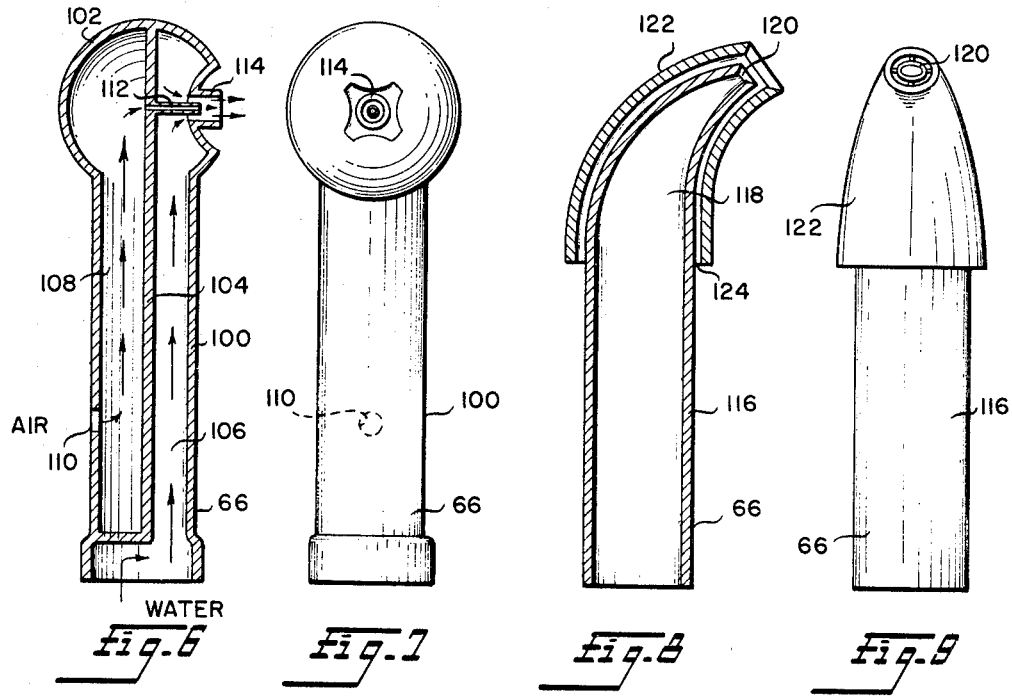
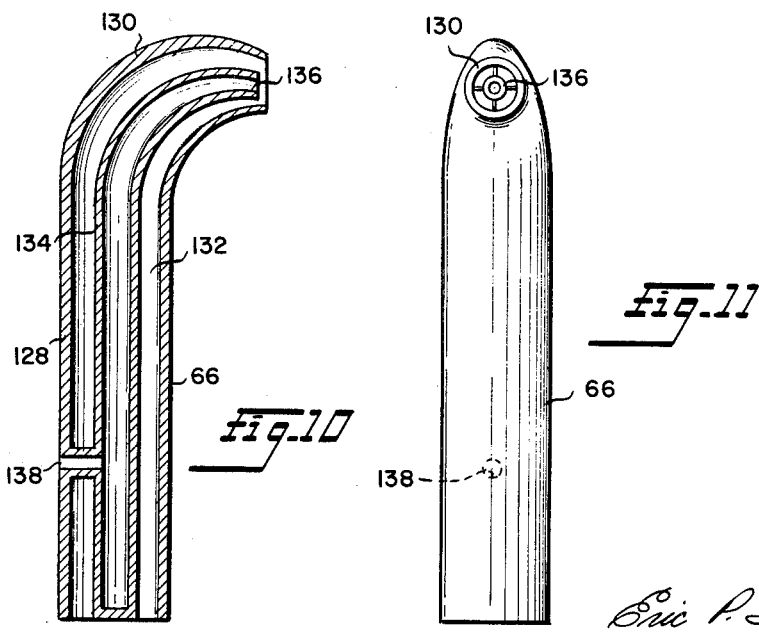
INVENTOR
William E. Lloyd
Eric P. Schellin
ATTORNEY

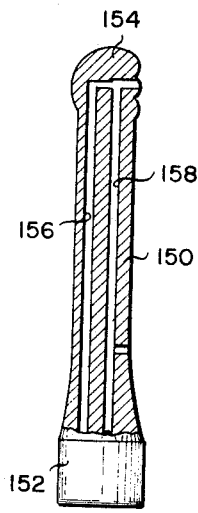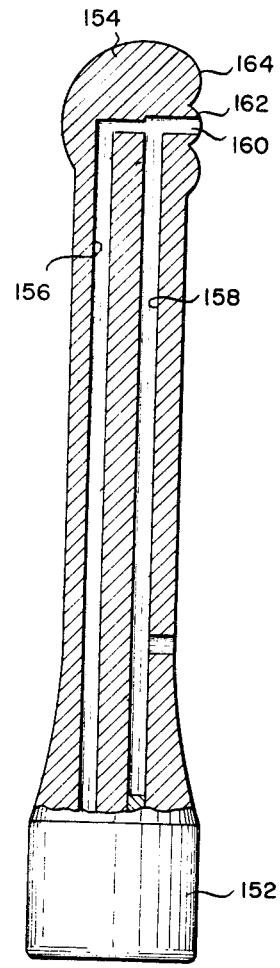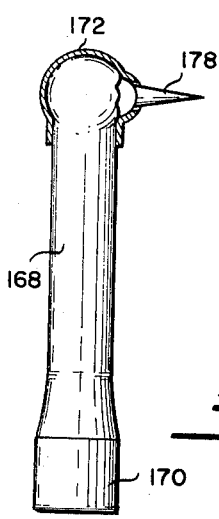

INVENTOR
William E. Lloyd

United States Patent Office 3,496,933
Patented Feb. 24, 1970

3,496,933
ORAL CLEANING DEVICE
William E. Lloyd, Salt Lake City, Utah, assignor to Sales Research Development Co., Salt Lake City, Utah, a corporation of Nevada
Filed Aug. 7, 1967, Ser. No. 658,744
Int. Cl. A61h 9/00; A61m 1/00, 3/00
U.S. Cl. 128—66                16 Claims

ABSTRACT OF THE DISCLOSURE

An oral cleaning hydrotherapy device using jet-aerated water and more particularly a device forming a compact arrangement for cleaning of teeth and gum tissue and the like comprising a water and cleansing material reservoir with pump means for pumping a mixture of cleansing material and water through a tubular member and out of a nozzle in order to clean and massage the oral cavity.

---

In accordance with the present invention, an oral dental hygiene appliance for convenient and easy home use is provided to either replace the tooth brush or to supplement the use of the tooth brush.

It is an object of the present invention to provide a hydrotherapy device using jet-aerated water which jet-aerated water causes a massaging action and therefore stimulates cardiovascular-lymphatic circulation and further results in a cleansing action and which device is further utilized as an irrigation device.

It is another object of the present invention to provide an oral cleansing hydrotherapy device provided with a nozzle means having a ball end provided with a plurality of manual massaging tips which not only massage the gums but help to dislodge debris in the interproximal spaces and also help to cleanse the surfaces of the teeth.

It is an object of the present invention to provide a self-contained unit or oral dental hygiene device provided with a handle adapted to receive a various number of different types of discharge nozzles for discharging jet-aerated water under pressure therethrough in order to massage the gums and clean between teeth, and along the gum line, and around dental appliances or dentures in order to promote a clean and fresh oral cavity.

It is another object of the present invention to provide a self-contained unit in which is disposed a pump and tubing means for supplying water under pressure to the discharge nozzle and which unit further contains metering means therein for controlling the proper amount of cleansing material to be dispersed within the water path through the discharge nozzle.

It is yet another object of the present invention to provide a device for cleansing the oral cavity including the teeth and gums and gum areas which is provided with valve control means for quickly regulating the flow of the cleansing material and water through the cleaning nozzle.

In accordance with the present invention, a reservoir is provided in which a partition means separates the cleaning water from a liquid cleansing material. A metering valve is provided with inlets in communication with the respective water reservoir and the cleansing material reservoir in the receptacle for regulating the proper amount of cleansing material and water. A pump is further provided for receiving the proper amount of water and cleansing material from the metering means and for discharging it through a flexible tubing member into a handle. The pump is preferably driven by an electric motor means that can be plugged into any conventional outlet in the house or place of use of the device. The tubing passes through a handle to which is attached a nozzle and the handle is further provided with preferably by-passing means for controlling the volume of water and mouth wash or cleansing material passed through the handle and the nozzle. Furthermore, the discharge nozzle of the present invention may be quickly interchanged with various other types of nozzles as desired. The nozzles are arranged so that when water is forced therethrough, air passage means are provided, so that through venturi action air is also pulled through the nozzle so as to produce an aerated jet water which is discharged from the nozzle in a steady stream. Thus the stream of aerated water impinges upon the teeth or the gum tissues in the oral cavity so that in addition to producing a cleansing action, it further produces a massaging action. Furthermore, the nozzle may be provided with a plurality of manual massaging tip means so that the gum tissues may be massaged as the liquid is discharged from the nozzle.

Various other objects and advantages of the present invention will be readily apparent from the following detailed description when considered in connection with the accompanying drawings forming a part thereof and in which:

FIGURE 1 is a perspective view of the self-contained oral hygiene cleansing device of the present invention;

FIGURE 2 is an enlarged more or less diagrammatic view of the oral hygiene cleansing device shown in FIGURE 1;

FIGURE 3 is an enlarged detailed view partly in section of the handle means and a nozzle disposed thereon illustrating the valve means embodied in the present invention shown in a closed position so that there is no flow of cleansing liquid and water through the nozzle of the device;

FIGURE 4 is a fragmentary detailed view similar to FIGURE 3 but illustrating the valve means in an opened position so that the cleansing material and the water can flow through the tubing in the handle and out of the discharge nozzle;

FIGURE 5 is an enlarged perspective view of the valve arrangement shown in FIGURE 3;

FIGURE 6 is a side elevational view in section of one nozzle embodied in the present invention;

FIGURE 7 is a front view of the nozzle shown in FIGURE 6;

FIGURE 8 is a side elevational view in section of another nozzle embodied in the present invention;

FIGURE 9 is a front view of the nozzle illustrated in FIGURE 8;

FIGURE 10 is a side elevational view in section of still another type of nozzle embodied in the present invention;

FIGURE 11 is a front view of the nozzle illustrated in FIGURE 10;

FIGURE 12 is a side elevational view in section of another type of nozzle embodied in the present invention;

FIGURE 13 is an enlarged fragmentary detailed view of the nozzle shown in FIGURE 12;

FIGURE 14 is an elevational view of another nozzle embodied in the present invention;

Figure 15:
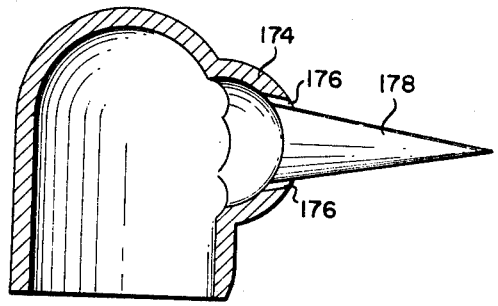
FIGURE 15 is an enlarged fragmentary view of the nozzle shown in FIGURE 14.

Referring to the drawings, the reference numeral 10 generally designates the oral hygiene cleansing device of the present invention. The oral device is provided with a base 12 with feet 14 for setting the apparatus on a surface. The base 12 is preferably made of plastic material and is oblong with a circular end portion 16 adjacent one side thereof. The circular or cylindrical reservoir 18 is provided with a large water compartment or section 20 and a smaller mouth wash or cleansing material compartment or section 22. The reservoir or receptacle 18 is preferably made of transparent plastic material and a partition 24 within the receptacle which separates the compartments 20 and 22 from each other. A lid or top 26 is provided for easy access to the interior of the compartments in order to replenish them with the proper amount of water and mouth wash or cleansing material. The bottom of the water compartment 20 is provided with an outlet in which is disposed a filter screen member 28 connected by small plastic tubing 30 to a metering device 32. The mouth wash or cleansing material compartment 22 is also provided with an outlet in which is disposed a perforated discharge tube 34 connected by plastic tubing 36 to the metering device 32.

The metering device 32 comprises a small cylindrical member having an enlarged bored end 38 into which is threaded a metering screw member 40 having a needle shaft 42 adapted to extend into a small drilled passage 44 which opens into a mixing chamber 46 which receives water through an inlet connection 48 connected to the tubing 30. The metering screw member 40 can be threaded inwardly or outwardly of the bored end 38 so as to properly adjust the needle shaft 42 to regulate or pass a predetermined amount of cleansing material through the drill passage 44 and into the mixing chamber 46 in order to mix with the water entering the inlet chamber from the water compartment 20. The metering device is further provided with a discharge connection or outlet pipe 30 connected by tubing 52 to the inlet of a vane pump 54. The pump 54 is coupled by a conventional shaft and coupling arrangement 56 to an electric motor 58. The electric motor 58 is provided with the usual electric cord and outlet plug 60, as shown in FIGURE 1, for plugging into any outlet in the house or the place of use of the device.

The discharge side or the outlet of the pump 54 is connected to a coiled plastic tubing member 62. The member 62 may be arranged by any well-known means so that it automatically recoils within the interior of the end portion 16 of the device, when the apparatus is not in use.

The discharge end of the flexible plastic tubing 62 passes through the handle 64 and into the discharge nozzle 66 which is attached to the opposite end of the handle 64. The handle 64 has the tubing 62 secured thereto by any well-known means, and preferably forms a press fit with the upper end of the handle 64, as best seen in FIGURE 3, so that the tubing will not inadvertently fall out of the handle 64. The handle 64 is preferably hollow and cylindrical in configuration with its upper end having a boss or solid reduced end portion 68 thereon. The end portion 68 is provided with an O-ring seal 70 thereon which forms a liquid tight seal with the enlarged bell-shaped end 72 of the nozzle 66. The nozzle 66 is detachably connected to and locked on the end of the hollow handle 64 by conventional and well-known bayonet locking means. The discharge end of the tubing 62 further communicates with the water passage of the nozzle and is secured thereto by any well-known means so that the water is only discharged into the water receiving passage of any type of nozzle that is disposed on the handle 64.

Referring to FIGURES 3-5 it will be noted that the hollow handle 64 is provided with valve control means generally designated 74. The valve control means 74 comprise a solid cylindrical button member 76 projecting out of a circular recess 78 formed in the upper end of the handle 64. The recess 78 is formed by a cylindrical inwardly projecting member 80 having a rectangular slot 82 extending therethrough. The slot 82 has a rectangular bar or arm 84 extending therethrough and having one end terminating in the bottom of the button member 76 and the other end provided with a hollow short sleeve 86 thereon. The sleeve 86 is adapter to receive one end of a biasing spring 88 therein and the other end of the spring 88 is mounted in a similar sleeve 90 disposed on the inner wall of the handle 64.

The button member 76 is provided with two spaced bores or cylindrical recesses 92 therein adapted to receive one end of tension springs 94 which have their opposite ends disposed in similar bores 96 in the inwardly projecting member 80 of the handle 64. The button member 76 may be secured by any well-known suitable means within the recess 78 so that it does not fall out of it. The tension springs 94 normally urge the button member 76 out of the recess 78 so as to maintain the outer end of the button member 76 projecting outwardly of the surface of the handle 64, as shown in FIGURE 3.

The slotted bar 84 is provided with an elongated slot 98 therein through which the tubing 62 is threaded. The biasing spring 88 normally urges the end of the slot 98 adjacent the spring 88 against the tubing 62 so as to pinch it off and clamp it in a closed position as illustrated in FIGURE 3. At this time, there is no flow of liquid and mouth wash material through the tubing as it is completely shut off and in a clamped position.

When it is desired to release the clamping action of the bar 84 against the tubing 62, the user of the oral device of the present invention merely presses the button 76 downwardly or in a direction opposite to the action of the spring 88, so that the button assumes the pressed down position illustrated in FIGURE 4. At this time, the sleeve 86 compresses the spring 88 and releases the pressure of the end of the slot 98 against the tubing 62 so that the tubing is in a completely opened position and when the pump 54 is operating the liquid will pass through the tubing 62 and into the discharge nozzle 66. Thus, the valve action embodied in the present invention gives an accurate and precise control of the flow of the cleansing liquid through the handle 64.

Referring to FIGURES 6 and 7, the nozzle 66 therein is provided with a cylindrical section 100 with a ball 102 on its discharge end. A partition 104 divides section 100 into a water passage 106 and air passage 108. An air inlet 110 and an air outlet nozzle or orifice 112 are provided in air passage 108. The air is sucked in through inlet 110 and discharged through 112 when water under pressure passes through water passage 106. The ball 102 is further provided with a plurality of neoprene radii 114, is best seen in FIGURE 7, projecting therefrom to form a manual massaging device. The arrows in FIGURE 6 indicate the flow path of the air and the water through the nozzle and out the discharge outlet or orifice therefrom.

Referring to the embodiment of the invention shown in FIGURES 8 and 9, the nozzle therein comprises a cylindrical section 116 having a gradually reduced or converging water passage 118 provided with an outlet orifice 120. The converging portion 118 of the nozzle has an outer sleeve 122 disposed thereover forming an annular air passage 124 around the converging water passage 118. Thus, this nozzle emits a central jet of water therefrom with a surrounding screen of air therearound.

Referring to the embodiment of the invention shown in FIGURES 10 and 11, the nozzle therein is provided with a cylindrical section 128 which is curved at the end 130 and is also reduced in cross section or converges at the end thereof. Disposed centrally of the air passage 132 formed by the converging section 128 is a central air nozzle 134 which also is turned and converges at 136 in the same manner as the end 130 of the section 128. The air is introduced into the central air nozzle 134 through an air passage 138 extending through the wall of the section 128.

The operation of this nozzle is such that the liquid passing through the water passage 132 by venturi action causes air to be drawn into the air passage 138 and through the air passage 134 wherein it is discharged through the orifice 136 and emitted from the nozzle end 130 with the cleansing material and the jet stream of water.

It will also be noted that projections 140 on portion 16 are provided for storing the nozzle 66.

Referring to the embodiment of the invention shown in FIGURES 12 and 13, the nozzle therein is provided with a cylindrical section 150 which is provided with a cap end 152 for securing it on the handle and a ball end 154 from which the aerated water is discharged. The nozzle is provided with a water passage 156 and an air passage 158 which communicates with the water passage 156 adjacent the ball end 154. The water is discharged through the outlet passage 160 which is disposed centrally of the ball end 154 thereon and extends through a central ball projection 162. A plurality of massaging tips 164 are spaced about the ball 162.

Figure 16:
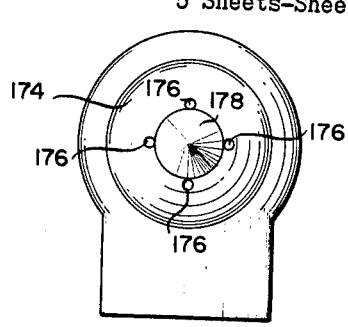
FIGURE 16 is a front view of the nozzle shown in FIGURE 15.

Referring to the embodiment of the invention shown in FIGURES 14 to 16, the nozzle 168 is similar in shape to the nozzle 150 and is provided with similar water and air passages therein, and a cap end 170 and a ball or discharge end 172. The end 172 is provided with a half hemispherical projection 174 having a plurality of spaced outlet passages or vents 176 therein through which the water and air is discharged. The end 172 communicates with the usual water and air passages in the nozzle 168. Disposed centrally of the hemispherical projection 174 is a laterally or horizontally extending cone member 178 which projects well beyond the projection 174 and converges into a point.

The operation of this nozzle is such that the liquid passing through the water and air passages in the nozzle 168 is discharged into the interior of the ball end 172 and is then discharged through the vents 176.

Figure 17:
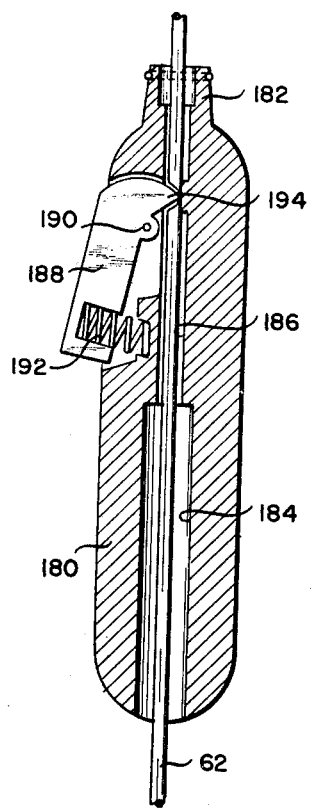
FIGURE 17 is a view of a modification of the handle means embodied in the present invention.

Referring to the modification of the handle 180 in FIGURE 17, the flexible plastic tubing 62 passes through the handle 180 so that a nozzle can be secured on the handle portion 182 as described in connection with the handle shown in FIGURE 3. It will be noted that this handle 180 is provided with an enlarged recess passage 184 adjacent the lower end and a reduced recess passage 186 adjacent its upper end. The handle is provided with a pivoted control member 188 secured on a pin 190 that is attached to the handle 180 by any suitable means. The control handle member 188 is provided with a recess in its lower end in which a biasing spring is disposed so as to normally urge the lower end of the control handle 188, as best seen in FIGURE 17, so that the pointed clamp end 194 of the control handle 188 pinches off or closes the flexible tube 62 so that the water cannot flow through the flexible tube until the lower end of the control handle is urged against the biasing spring to permit the clamp 194 to open the flexible tubing 62.

From the foregoing description, it is apparent that the present invention provides a compact and self-contained oral hygiene unit that utilizes an aerated jet of water under pressure by pumping water from a water reservoir, to which is added a predetermined amount of mouth wash or cleansing material so as to properly clean effectively between, around and beneath pontics and which promotes proper circulation in the gum areas, and eliminates stagnation of food debris in important areas that an ordinary tooth brush may not reach.

The present invention further provides a device which removes impurities from tiny female attachments, abutment teeth, under clasps, lingual bars and rest for people with precision or semi-precision partition dentures.

It is also apparent that the oral dental hygiene device of the present invention assures a more refreshed and clean oral cavity through the use of mouth wash and the massaging action of aerated water jet stream of the oral dental hygiene appliance to help prevent decay and cleanse difficult to reach areas between the teeth and along the gumline, permitting better breath. Furthermore, the present invention creates a hydrotherapy-hydromassage effect for the purpose of stimulating local blood circulation where applied and the lymphatic circulation where applied, improving tissue oxidation, and effecting a gentle but powerful massage creating a passage exercise effect helping to bring about improved tissue tone.

What is claimed is:

1. An oral dental hygiene device comprising a receptacle, a partition in said receptacle defining a water compartment, and a cleansing liquid compartment, a mixing chamber connected to said water compartment, connections between said mixing chamber and said cleansing solution compartment and including metering means, tubing means for receiving liquid from said mixing chamber, handle means connected to the discharge end of said tubing for connecting a liquid discharge nozzle thereto, a discharge nozzle detachably connected to said handle means for dispensing liquid therefrom, means for supplying liquid under pressure to said nozzle from said mixing chamber, and air inlet means in said nozzle for causing an aerated jet of liquid under pressure to be discharged from said nozzle.

2. The device of claim 1, wherein said metering member includes a hollow bore with a threaded needle screw therein with separate inlets in communication with each of said compartments and a single discharge outlet.

3. The device of claim 2, wherein said handle means includes a valve means for controlling the flow of liquid through said tubing and nozzle.

4. The device of claim 3, wherein said valve means includes a slidable member with a slot therein through which said tubing extends and biasing means normally urging said slidable member against said tubing to pinch it off and button means for sliding said slidable member in a direction toward said biasing means to unclamp said tubing and permit liquid to flow through said tubing.

5. The device of claim 4, wherein said handle means is hollow and said tubing means is threaded through opposite ends of said handle means.

6. The device of claim 4, wherein a base is provided for receiving said receptacle therein adjacent one end thereof, and for housing said tubing, means for supplying said liquid under pressure, and for holding said handle and nozzle thereon when not in use.

7. The device of claim 6, wherein said nozzle is provided with a ball end for snapping on the end of said handle.

8. The device of claim 7, wherein said nozzle comprises a cylindrical section with a ball end and a partition dividing it into a liquid and an air passage, and said air passage has an inlet in communication with the atmosphere and an outlet in communication with said liquid passage to create a venturi action.

9. The device of claim 7, wherein said nozzle comprises a cylindrical central liquid passage and a sleeve surrounds said liquid passage and forms an annular air passage.

10. The device of claim 9, wherein said nozzle is curved adjacent its discharge end and said liquid and air passages are of reduced cross section adjacent their discharge ends.

11. The device of claim 7, wherein said nozzle comprises a cylindrical section with a central air tube having an air inlet in communication with the atmosphere and an outer liquid passage surrounding said tube.

12. The device of claim 3, wherein said valve means includes a pivoted control member, said control member being pivotally connected at one end to said handle means, and having a biasing member at its other end normally urging said one end of said control member against said tubing to close it off.

13. The device of claim 12 wherein said one end of said control member is provided with a pointed clamp section which bears against said tubing.

14. The device of claim 13 wherein said handle means is provided with a recess in the side thereof and said control member is disposed therein.

15. The device of claim 1 wherein said nozzle is provided with a water and an air passage therein, and a discharge end in communication with said passages, said discharge end having an outwardly extending projecting member with a plurality of vents therein, and a central conical member disposed on said projecting member.

16. The device of claim 15 wherein said outer end is circular in front cross sectional configuration and said vents are circumferentially disposed around said cone.

References Cited

UNITED STATES PATENTS

| | | | |
|---|---|---|---|
| 2,102,111 | 12/1937 | Cleveland | 128—229 |
| 2,550,565 | 4/1951 | Hyser | 128—229 |
| 2,733,713 | 2/1956 | Kabnick | 128—230 |
| 2,757,668 | 8/1956 | Meyer-Saladin | 128—173.1 |
| 3,044,465 | 7/1962 | Anderson et al. | |
| 3,393,676 | 7/1968 | Kummer et al. | 128—173.1 |

L. W. TRAPP, Primary Examiner

U.S. Cl. X.R.

128—230, 239